(12) United States Patent
Kruempelmann et al.

(10) Patent No.: US 11,784,882 B2
(45) Date of Patent: Oct. 10, 2023

(54) CONFIGURATION MONITORING IN A CLOUD PLATFORM

(71) Applicant: SAP SE, Walldorf (DE)

(72) Inventors: Wulf Kruempelmann, Altlussheim (DE); Susanne Schott, Walldorf (DE)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 17/487,395

(22) Filed: Sep. 28, 2021

(65) Prior Publication Data
US 2023/0094140 A1    Mar. 30, 2023

(51) Int. Cl.
*G06F 15/177* (2006.01)
*H04L 41/08* (2022.01)
*H04L 41/084* (2022.01)
*G06F 9/455* (2018.01)
*H04L 41/0816* (2022.01)

(52) U.S. Cl.
CPC ...... *H04L 41/0883* (2013.01); *G06F 9/45558* (2013.01); *H04L 41/0816* (2013.01); *H04L 41/0843* (2013.01); *G06F 2009/4557* (2013.01); *G06F 2009/45595* (2013.01)

(58) Field of Classification Search
CPC . H04L 41/0883; H04L 41/0843; H04L 43/16; H04L 41/0895; H04L 41/0816; H04L 41/5096; H04L 43/10; H04L 41/5009; H04L 41/5054; G06F 9/45558; G06F 2009/4557; G06F 2009/45595; G06F 2009/45591; G06F 11/30
See application file for complete search history.

(56) References Cited

U.S. PATENT DOCUMENTS

| | | | |
|---|---|---|---|
| 11,461,322 B1 * | 10/2022 | Plenderleith | G06F 16/2456 |
| 2018/0146069 A1 * | 5/2018 | Du | H04L 67/1008 |
| 2020/0073717 A1 * | 3/2020 | Hari | G06F 9/5061 |

* cited by examiner

*Primary Examiner* — John B Walsh
(74) *Attorney, Agent, or Firm* — Mintz Levin Cohn Ferris Glovsky and Popeo, P.C.

(57) ABSTRACT

Methods, systems, and articles of manufacture, including computer program products, are provided for configuration monitoring. In some embodiments, there is provided a method that includes: sending a container image to a second cloud platform hosting a production system, wherein the container image includes configuration instructions to configure monitoring of an application at the production system hosted at the second cloud platform and at least one value to be monitored at the application at the production system hosted at the second cloud platform; receiving at least one message including the at least one value indicative of a current state of the application and/or the cloud platform; comparing the at least one value to at least one threshold; and in response to the at least one value exceeding the at least one threshold, sending an alert message.

19 Claims, 4 Drawing Sheets

CONFIGURATION MONITORING IN A CLOUD PLATFORM

BACKGROUND

An application may be hosted by a cloud-computing platform such that the application may be remotely accessible to multiple tenants, for example, over the Internet. To illustrate, the application may be available as a cloud-based service including, for example, a software as a service (SaaS) and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, payroll, time and attendance management, recruiting and onboarding, learning and development, performance and compensation, workforce planning, and/or the like.

SUMMARY

Methods, systems, and articles of manufacture, including computer program products, are provided for configuration monitoring. In some embodiments, there is provided a system including at least one data processor; and at least one memory storing instructions, which when executed by the at least one data processor, result in operations comprising: sending, by a first cloud platform hosting a development system, a container image to a second cloud platform hosting a production system, wherein the container image includes configuration instructions to configure monitoring of an application at the production system hosted at the second cloud platform and at least one value to be monitored at the application at the production system hosted at the second cloud platform; receiving, by the first cloud platform hosting the development system, at least one message including the at least one value indicative of a current state of the application and/or the cloud platform; comparing, by the first cloud platform hosting the development system, the at least one value to at least one threshold; and in response to the at least one value exceeding the at least one threshold, sending an alert message.

In some variations, one or more of the features disclosed herein including the following features can optionally be included in any feasible combination. The container image further includes code and data for providing the application. The application includes a database instance. The at least one value includes monitoring a size of a database table. The at least one message is a heartbeat message including the at least one value indicative of the current state of the application and/or the cloud platform. The current state indicates at least the size of the database table. The container image is sent to the second cloud platform via a representational state transfer application programming interface at the first cloud platform. The at least one message is received via the representational state transfer application programming interface at the first cloud platform. The container image is deployed as a container at one or more virtual machines at the second cloud platform to provide the application at the production system. The alert message is sent to a system that stores and/or tracks issues with the application at the second cloud platform. The at least one value to be monitored is determined or set while the application is developed at the first cloud platform hosting the development system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the transportation of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
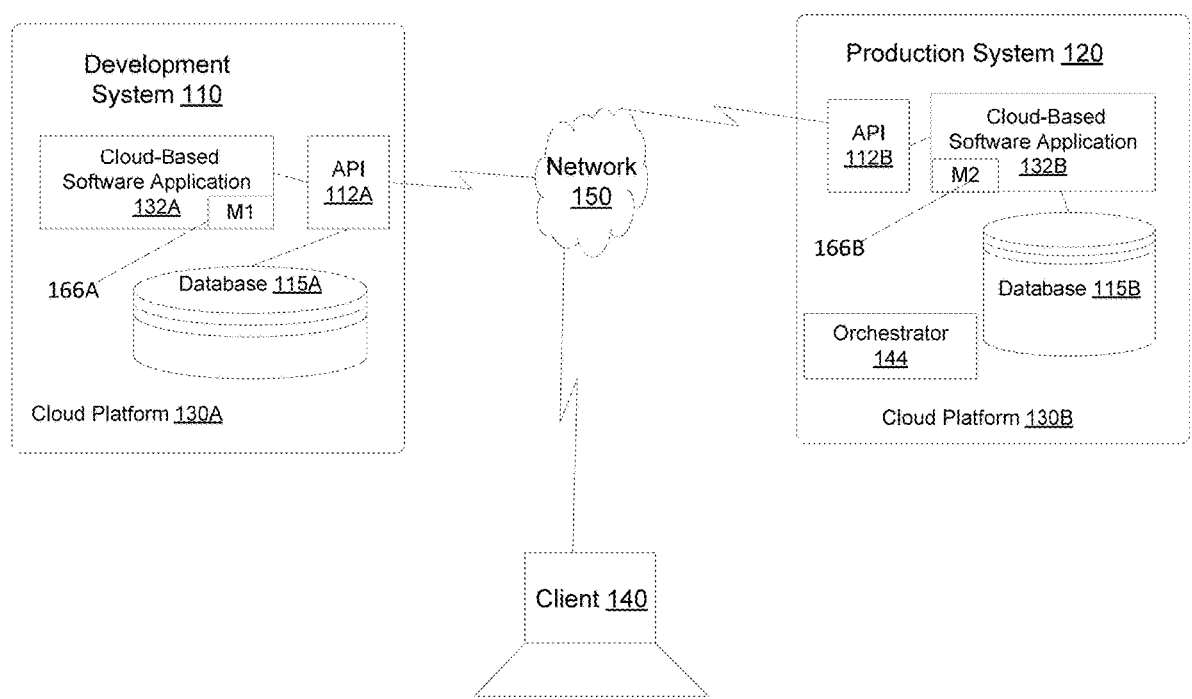
FIG. 1 depicts an example of a system diagram including a development system and a production system, in accordance with some example embodiments.

When practical, like labels are used to refer to same or similar items in the drawings.

DETAILED DESCRIPTION

In complex cloud-based systems, the cloud-based system may include at least one aspect, such as a value, that is monitored. These monitored values may be specific to the configuration of the process or processes of the cloud-based system. As an example, a batch job for a cloud-based system may have a peak with respect to memory usage, processor usage, storage usage, and network bandwidth usage. The monitoring may include the values of memory usage, processor usage, storage usage, and network bandwidth usage for the cloud-based systems. And, these values may be compared to thresholds to assess whether the current state of the memory usage, processor usage, storage usage, and network bandwidth usage exceed the threshold, and if one or more of these values exceed a threshold, an indication (e.g., alert, message, and/or the like) may be triggered. However, these values (and thus the corresponding thresholds) may be specific to the cloud-based system, its configuration, time of day, day of year, and other factors. In the case of the cloud-based system providing payroll processing, the cloud-based system may have a peak usage of resources (e.g., in terms of memory usage, processor usage, storage usage, and/or network bandwidth usage) towards the end of a given month or at other times, for example. But in the case of a procurement or invoice processing, the cloud-based system may have a peak usage of resources (e.g., in terms of memory usage, processor usage, storage usage, and/or network usage) more in line with certain times during the year when goods and services are bought and then paid for 30 or 60 days later. These examples illustrate how the monitored values and the thresholds for those values may be very specific to the process being implemented at the cloud-based system.

Moreover, when a cloud-based system is developed, the cloud-based system may be first deployed to a development environment. While in this development environment, the "development system" may be built, configured with data, executed, tested, and at the appropriate time released as a "production" system.

In some example embodiments, there may be provided a development system and a production system, wherein the development system is configured to monitor the production system. Rather than use a third party monitoring system, the development system itself monitors the production system. As the development system is being developed, the logic of the development system processes and the values for certain settings are also being developed and configured as well. In some example embodiments, the development system may include a monitoring engine with knowledge regarding one or more values being monitored during runtime of the development systems and one or more thresholds for the monitored values, such that if a threshold is triggered an indication, such as an alert, alarm, or other type of message is generated and/or sent. And, these monitored values and their corresponding thresholds may be stored at the development systems. When the development system is ready for deployment, a copy of the development system may be deployed (e.g., via a container) to a cloud platform to provide the production system. And, the deployed copy includes the monitoring engine as well as instructions indicating which one or more values to monitor and report to the development system.

When the development system is transported in a container for example, the container may include instructions (e.g., code, script, etc.), data (e.g., configuration data), and the like to build the runtime production system in the cloud platform (e.g., hosted at a physical machine running a virtual machine). This container may configure the production system to (1) perform monitoring of one or more values (e.g., perform one or more measurements of the one or more aspects of the process and/or the cloud platform environment hosting the production system) and to (2) report the monitoring as, for example, a message, such as a heartbeat message including the one or more values being monitored. The development system may maintain a connection to the production system, so the heartbeat message(s) to the development system may be via the connection.

As the development system includes the one or more thresholds for the one or more values being measured, the development system may compare one or more values received from the production system to the thresholds stored at the development system. As noted, the production system may report the one or more values in a heartbeat message (which may be a periodic or scheduled message sent from the production system towards the development system), although messages other than heartbeat messages may be used and messages that are aperiodic may be used as well. Based on the comparison, the development system may determine whether to trigger an indication, such as an alert, alarm, incident, alert, event, and/or other type of indication. For example, if the heartbeat message indicates a date, a time, a CPU percentage usage, and a memory percentage usage, the development system may compare the values in the heartbeat message to the stored thresholds for the CPU usage percentage and/or memory usage percentage. And, this comparison may also take into account data and time (e.g., by comparing the received values to stored thresholds for the corresponding data and time of the received CPU usage and/or memory). In this example, if either of the CPU usage percentage or the memory usage percentage exceeds their corresponding threshold, the development system may trigger an indication, such as an incident message. The thresholds may be time dependent as well, such that the stored thresholds vary based on time of day and/or date.

Moreover, the development system may monitor a plurality of production systems (e.g., a plurality of production system instances may be deployed to a cloud platform). When this is the case, the development system may compare values received from a given production system, to thresholds mapped for that given production system (which provided the values). This may enable the thresholds to be specific to (or customized for) the given production system. By using a development system to monitor the production system for any potential performance issues at the production system, there is no need for a separate monitoring engine as the development system performs the monitoring. Also, communication resources may be reduced as the threshold information does not need to be transported to the production system for monitoring or a separate monitoring system.

Before providing additional description regarding the noted development system monitoring, the following provides a description of an example of a system environment in which the monitoring may be implemented.

FIG. 1 depicts a diagram illustrating an example of a system 100, in accordance with some example embodiments. Referring to FIG. 1, the system 100 may include a development system 110 hosted on a first cloud platform 130A and a production system 120 hosted in a second cloud platform 130B. The development system 110, the production system 120, and the client 140 may be communicatively coupled via a network 150. It should be appreciated that the network 160 may be any wired and/or wireless network including, for example, a wide area network (WAN), local area network (LAN), a virtual local area network (VLAN), the Internet, and/or the like. Although the development system 110 is hosted on the first cloud platform 130A and the production system 120 is hosted on the second cloud platform 130B, the development system and the production system may be hosted on the same cloud platform as well.

The cloud platforms 130A and 130B may each provide resources that can be shared among a plurality of tenants.

For example, the cloud platform 110 may be configured to provide a variety of services including, for example, software-as-a-service (SaaS), platform-as-a-service (PaaS), infrastructure as a service (IaaS), database as a service (DaaS), and/or the like. And, these services can be accessed by one or more tenants of the cloud platform 110. In the example of FIG. 1, a single tenant 140 (labeled client) is depicted as having access (via network 150) to the cloud platforms, although other quantities of tenants may be implemented and hosted at the cloud platforms as well. The client 140 of FIG. 1 may comprise at least one user device (e.g., a computer including an application such as a browser or other type of application). In some implementations, the tenants at a cloud platform do not share their data with other tenants (absent permission from a tenant). Alternatively, each of the tenants at a cloud platform may represent a single tenant at the cloud platform, such that the tenants do share a portion of the tenant's data, for example.

The cloud platforms 110A-B may each include resources, such as at least one computer (e.g., a server), data storage, and a network (including network equipment) that couples the computer(s) and storage. Each of the cloud platforms may also include other resources, such as operating systems, hypervisors, and/or other resources, to virtualize physical resources (e.g., via virtual machines), provide deployment (e.g., via containers) of applications (which provide services, for example, on the cloud platform, and other resources. In the case of a "public" cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the cloud platform may be a "private" cloud platform, in which case the resources of the cloud platform may be hosted on an entity's own private servers (e.g., dedicated corporate servers operated and/or owned by the entity). Alternatively, or additionally, the cloud platform may be considered a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

The development system 110 may include a service, such as cloud-based application 132A and a database 115A. As noted, the development system may be used to develop and configure the development system (which in this example includes instances of an application 132A and a database 115A). The development system may include an API 112A. For example, the API may be implemented as an Open Data Protocol (OData) interface (e.g., HTTP message may be used to create a query to a resource identified via a URI), although the API 112A may be implemented with other types of protocols including those in accordance with REST (Representational state transfer). In the example of FIG. 1, the database 115 may be accessed as a service at the first cloud platform 130A, which may be the one the same or different cloud platform from the first cloud platform 130A. In the case of REST compliant interfaces, the API 112A may provide a uniform interface that decouples the client and server, is stateless (e.g., a request includes all information needed to process and respond to the request), cacheable at the client side or the server side, and the like.

The development system 110 may be deployed to the cloud platform 130A via a container, which provides a package or bundle of software, libraries, configuration data to enable an orchestrator 144 at the first cloud platform to deploy during runtime instances of the application 132A and/or database 115A to, for example, one or more virtual machines that provide the service at the first cloud platform. In the example of FIG. 1, the service is deployed during runtime, and provides at least one application such as an application 132A (which is the runtime application providing the service and served to the client 140). In the example of FIG. 1, the application 132A includes a monitoring engine 166A, which may be deployed via the container to the cloud platform 130A.

During the development of the development system, the application 132A is developed, configured with data so it can be deployed for production and tested. During the development, the monitoring engine 166A obtains one or more values to monitor and/or the thresholds for those values. The monitoring engine may be configured (e.g., via a table or user interface input) with the values and/or thresholds. Alternatively, or additionally, the monitoring engine may learn (e.g., via a machine learning model) the values and/or thresholds.

To illustrate by way of an example, a database table, such as a database table containing master data (which may be a relatively large data when compared to other tables) may be on the order of several terabytes in size. This database table containing master data may be located in a separate storage or database. As the width of the table is known (e.g., a width of 2200 Bytes) and the database space is limited by hardware or resource constraints, the size of the table may be determined as follows:

Select count*from T_MATERIAL into NUMBER_OF_ENTRIES, wherein the select count returns the number of entries in the database table, which in this example is a database table containing master data. With the number of entries and width of the database table are known, the size of the database table may be determined as follows:

SIZE=NUMBER_OF_ENTRIES*WIDTH. In this example, the size may be monitored, such that if the size of the database table exceeds 50% threshold of the storage or memory space allocated for the database table, an alert may be sent. Other tables in the database tables for the database 115A may have similar thresholds for its tables. These thresholds may be determined or set during the development of the database 115A, while at development system 110.

Table 1 below depicts an example of one or more values that the monitoring engine 162A monitors. These values include the percentage of the processor resources at the cloud platform 130A being used by the application 132A, the percentage of the memory resources at the cloud platform 130A being used by the application 132A, the percentage of the storage resources at the cloud platform 130A being used by the application 132A, the number of active connections to client devices being used by the application 132A, and data and time. These values their corresponding thresholds (listed at Table 2 below) may be determined or set during the development of the database 115A, while at development system 110. Although Table 1 depicts a certain set of values, other values may be used to assess the health or performance of the application 132A (and/or database 115A) while operating at the cloud platform.

TABLE 1

| % Processor | % Memory | % Storage | Active Connections | Date/Time |
|---|---|---|---|---|
| 20% | 5% | 1% | 10 | 1800 hrs, June 1, 1999 |
| 10% | 15% | 10% | 5 | 1100 hrs, April 1, 1999 |

Table 2 below depicts an example of one or more thresholds that the monitoring engine 162A uses to decide whether to trigger an indication, such as an alert. These thresholds include the threshold percentage of the processor resources at the cloud platform 130A which if exceeded triggers the indication, the threshold percentage of the memory resources at the cloud platform 130A which if exceeded triggers the indication, the threshold percentage of the storage resources at the cloud platform 130A which if exceeded triggers the indication, the threshold percentage of the active connections at the cloud platform 130A which if exceeded triggers the indication, and data and time. Although Table 2 depicts a certain set of thresholds, other thresholds may be used to assess the health or performance of the application 132A (and/or database 115A) while operating at the cloud platform.

TABLE 2

| % Processor Threshold | % Memory Threshold | % Storage Threshold | Active Connections Threshold | Date/Time |
|---|---|---|---|---|
| 25% | 15% | 20% | 15 | 1800 hrs, June 1, 1999 |
| 5% | 10% | 15% | 7 | 1100 hrs, April 1, 1999 |

The production system 120 may be deployed to and thus hosted at the second cloud platform 130B. When the development system 110 is ready to be released into production, a container image may be provided to the orchestrator 144 at the second cloud platform. This container image may include a package or bundle of software, libraries, configuration data to enable an orchestrator 144 at the second cloud platform to deploy a runtime container for the application 132B and/or database 115B to, for example, one or more virtual machines that provide the service at the second cloud platform 130B. In this example, the application 132B and database 115B are copies of the instances of the application 132A and database 115A instances at the first cloud platform 130A. And, the container image may be provided by the development system to the production system via the APIs 112A-B. Like API 112A, API 112B may be implemented as an Open Data Protocol (OData) interface, although the API 112B may be implemented with other types of protocols including those in accordance with REST (Representational state transfer).

The container may also include instructions (and the corresponding values to monitor) to run monitoring engine 166B. For example, the instructions may instruct monitoring engine to report to the development system one or more values measured at the production system. To illustrate further, the monitoring engine 166B mat be configured to monitor one or more of the values of Table 1 and report them back in a message, such as a heartbeat message, to the development system 110 and, in particular, the monitoring engine 166A. Once the monitoring engine receives the values from the production system, the monitoring engine may compare the values with one or more thresholds, such as the thresholds of Table 2, to determine whether to trigger an indication such as an alert and/or the like. In some embodiments, the thresholds (see, e.g., Table 2) are not provided to the production system 120, so the development system 110 keeps those thresholds and uses them to compare against the values provided by the production system. This approach may save network resources as the thresholds are not sent to the production system. In other embodiments, the thresholds (see, e.g., Table 2) are provided to the production system 120, so the production system including monitoring engine 166B compares the values to the thresholds and issues via the heartbeat message an alert to the monitoring engine 166A at the production system.

Although the previous example describes the development system 110 including the monitoring engine 166A monitoring the production system 120, the production system 120 including the monitoring engine 166B may be configured to monitor the development system 110 as well. For example, the development system 110 and the production system 120 may each be configured to perform periodic health checks in order to detect errors at a local system and/or a remote system.

Figure 2:
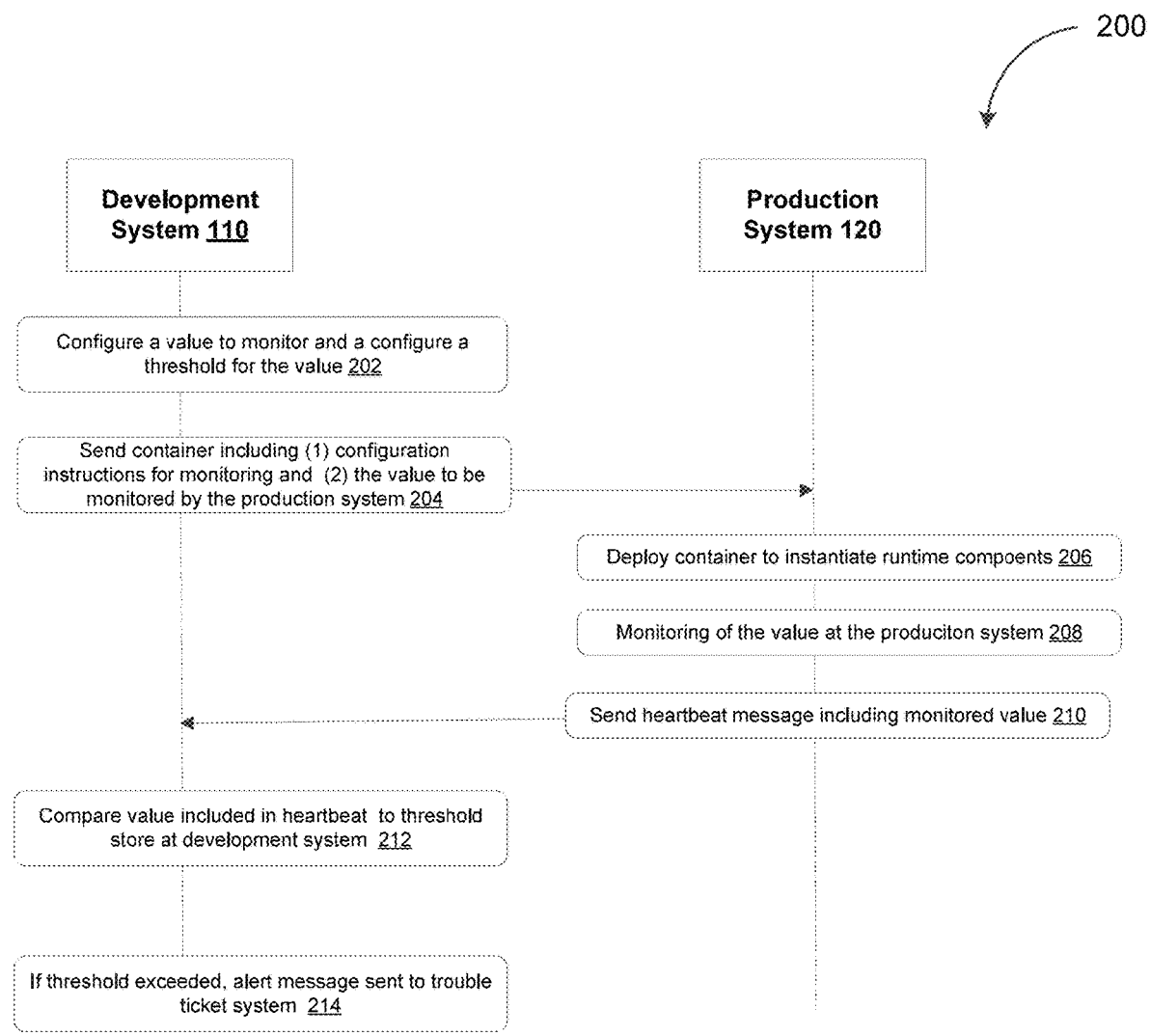
FIG. 2 depicts an example of a sequence diagram illustrating a process for monitoring, in accordance with some example embodiments.

FIG. 2 depicts a sequence diagram illustrating a process 200 for monitoring in a cloud-based platform.

At 202, at least one value is configured for monitoring and a corresponding threshold is configured. For example, the development system (or, e.g., monitoring engine 166A) at a first cloud platform may configure one or more values, such as the values of Table 1, and one or more corresponding threshold values, such as the values of Table 2. The values may be determined or set over time during the development and configuration of the application 132A and/or database 115A.

At 204, a container image may be sent including configuration instructions for monitoring an application (which is at a production system at a second cloud platform) and at least one value to be monitored. For example, the development system 110 may send (via APIs 112A-B) a container image including code, data, etc. for deploying application 132B and/or database 115B at the second cloud platform 130B hosting the production system 120. This container image may also include configuration instructions for monitoring an application (which is at a production system at a second cloud platform) and at least one value to be monitored. For example, these instructions may provide the monitoring engine 166 functionality at the application 166B and/or provide instructions on which values to monitor. A container image becomes a container at runtime.

At 206, the container may be deployed at the cloud platform 130B to instantiate runtime components that provide, for example, application 132B (including monitoring engine 166B), database 115B, and/or the like. Once deployed, the monitoring engine 16B may monitor, at 208, one or more values at the cloud platform in order to monitor performance and/or health of the application 132B and/or database 115B. In some implementations, the monitoring engine 166B may obtain the current state of the application 132B, database 115B, and/or second cloud platform 130B via an observability service (which is at the cloud service platform 130B) that provides information, such as the current values for the values depicted at Table 1. Alternatively, or additionally, the monitoring engine 166B may obtain the current state of the application 132B, database 115B, and/or second cloud platform 130B other mechanisms and/or may measure the value(s) as well.

At 210, the monitoring engine 166B may send a message, such as a heartbeat message, to the development system 110 (and, in particular, the monitoring engine 166A). The heartbeat message may include the one or more values being monitored at 208.

At 212, the monitoring engine 166A may receive the message including the value(s) and may compare the values to corresponding thresholds for those values. If a threshold is exceeded, the monitoring engine may generate and/or send, at 214, an alert message to a ticket system which stores and/or tracks issues with the application at the cloud platform.

Figure 3:
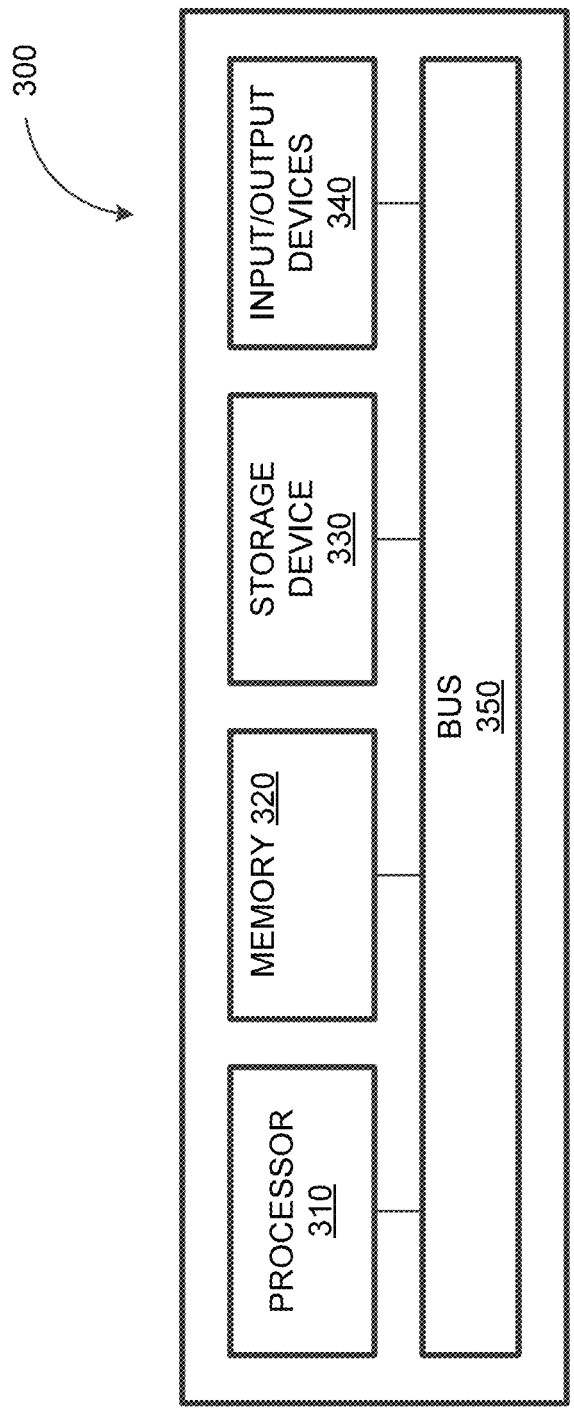
FIG. 3 depicts a block diagram illustrating a computing system, in accordance with some example embodiments.

FIG. 3 depicts a block diagram illustrating a computing system 300 consistent with implementations of the current subject matter. The computing system 300 can be used to implement the client 140, at least a portion of the cloud platform 130A or the cloud platform 130B. As shown in FIG. 3, the computing system 300 can include a processor 310, a memory 320, a storage device 330, and input/output devices 340. The processor 310, the memory 320, the storage device 330, and the input/output devices 340 can be interconnected via a system bus 350. The processor 310 is capable of processing instructions for execution within the computing system 300. In some implementations of the current subject matter, the processor 310 can be a single-threaded processor. Alternately, the processor 310 can be a multi-threaded processor. Alternately, or additionally, the processor 310 can be a multi-processor core. The processor 310 is capable of processing instructions stored in the memory 320 and/or on the storage device 330 to display graphical information for a user interface provided via the input/output device 340. The memory 320 is a computer readable medium such as volatile or non-volatile that stores information within the computing system 300. The memory 320 can store data structures representing configuration object databases, for example. The storage device 430 is capable of providing persistent storage for the computing system 400. The storage device 330 can be a solid-state device, a floppy disk device, a hard disk device, an optical disk device, a tape device, and/or any other suitable persistent storage means. The input/output device 340 provides input/output operations for the computing system 300. In some implementations of the current subject matter, the input/output device 340 includes a keyboard and/or pointing device. In various implementations, the input/output device 340 includes a display unit for displaying graphical user interfaces. According to some implementations of the current subject matter, the input/output device 340 can provide input/output operations for a network device. For example, the input/output device 340 can include Ethernet ports or other networking ports to communicate with one or more wired and/or wireless networks (e.g., a local area network (LAN), a wide area network (WAN), the Internet).

Figure 4:
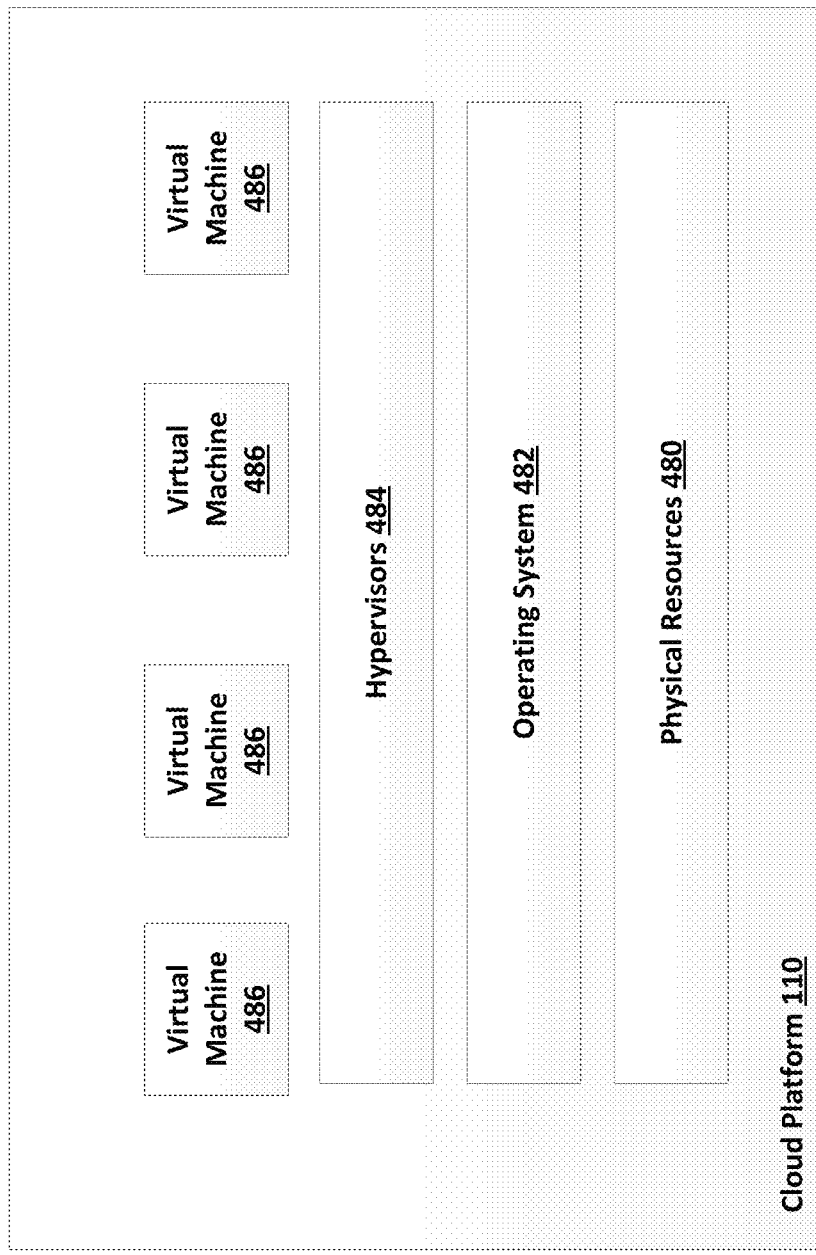
FIG. 4 depicts a block diagram illustrating an example of a cloud platform, in accordance with some example embodiments.

FIG. 4 depicts an example implementation of the cloud platform 110, which provided the cloud services. The cloud platform 110 may include physical resources 480, such as at least one hardware servers, at least one storage, at least one memory, at least one network interface, and the like. The cloud server may also include infrastructure, as noted above, which may include at least one operating systems 482 for the physical resources and at least one hypervisor 484 (which may create and run at least one virtual machine 486). For example, each multitenant application may be run on a corresponding virtual machine.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: sending, by a first cloud platform hosting a development system, a container image to a second cloud platform hosting a production system, wherein the container image includes configuration instructions to configure monitoring of an application at the production system hosted at the second cloud platform and at least one value to be monitored at the application at the production system hosted at the second cloud platform; receiving, by the first cloud platform hosting the development system, at least one message including the at least one value indicative of a current state of the application and/or the cloud platform; comparing, by the first cloud platform hosting the development system, the at least one value to at least one threshold; and in response to the at least one value exceeding the at least one threshold, sending an alert message.

Example 2: The system of example 1, wherein the container image further includes code and data for providing the application.

Example 3; The system of any of examples 1-2, wherein the application comprises a database instance.

Example 4: The system of any of examples 1-3, wherein the at least one value includes monitoring a size of a database table.

Example 5: The system of any of examples 1-4, wherein the at least one message is a heartbeat message including the at least one value indicative of the current state of the application and/or the cloud platform, the current state indicating at least the size of the database table.

Example 6: The system of any of examples 1-5, wherein the container image is sent to the second cloud platform via a representational state transfer application programming interface at the first cloud platform, and wherein the at least one message is received via the representational state transfer application programming interface at the first cloud platform.

Example 7: The system of any of examples 1-6 further comprising: deploying the container image as a container at one or more virtual machines at the second cloud platform to provide the application at the production system.

Example 8: The system of any of examples 1-7, wherein the alert message is sent to a system that stores and/or tracks issues with the application at the second cloud platform.

Example 9: The system of any of examples 1-8, wherein the at least one value to be monitored is determined or set while the application is developed at the first cloud platform hosting the development system.

Example 10: A method, comprising: sending, by a first cloud platform hosting a development system, a container image to a second cloud platform hosting a production system, wherein the container image includes configuration instructions to configure monitoring of an application at the production system hosted at the second cloud platform and at least one value to be monitored at the application at the production system hosted at the second cloud platform; receiving, by the first cloud platform hosting the development system, at least one message including the at least one value indicative of a current state of the application and/or the cloud platform; comparing, by the first cloud platform hosting the development system, the at least one value to at least one threshold; and in response to the at least one value exceeding the at least one threshold, sending an alert message.

Example 11: The method of example 10, wherein the container image further includes code and data for providing the application.

Example 12: The method of any of examples 10-11, wherein the application comprises a database instance.

Example 13: The method of any of examples 10-12, wherein the at least one value includes monitoring a size of a database table.

Example 14: The method of any of examples 10-13, wherein the at least one message is a heartbeat message including the at least one value indicative of the current state of the application and/or the cloud platform, the current state indicating at least the size of the database table.

Example 15: The method of any of examples 10-14, wherein the container image is sent to the second cloud platform via a representational state transfer application programming interface at the first cloud platform, and wherein the at least one message is received via the representational state transfer application programming interface at the first cloud platform.

Example 16: The method of any of examples 10-15, further comprising: deploying the container image as a container at one or more virtual machines at the second cloud platform to provide the application at the production system.

Example 17: The method of any of examples 10-16, wherein the alert message is sent to a system that stores and/or tracks issues with the application at the second cloud platform.

Example 18: The method of any of examples 10-17, wherein the at least one value to be monitored is determined or set while the application is developed at the first cloud platform hosting the development system.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure.

Other implementations may be within the scope of the following claims.

What is claimed is:

1. A system, comprising:
at least one data processor; and
at least one memory storing instructions, which when executed by the at least one data processor, result in operations comprising:
sending, by a first cloud platform hosting a development system, a container image to a second cloud platform hosting a production system, wherein the container image includes configuration instructions to configure monitoring of an application at the production system hosted at the second cloud platform and at least one value to be monitored at the application at the production system hosted at the second cloud platform;

receiving, by the first cloud platform hosting the development system, at least one message including the at least one value indicative of a current state of the application and/or the second cloud platform;

comparing, by the first cloud platform hosting the development system, the at least one value to at least one threshold; and in response to the at least one value exceeding the at least one threshold, sending an alert message.

2. The system of claim 1, wherein the container image further includes code and data for providing the application.

3. The system of claim 2, wherein the application comprises a database instance.

4. The system of claim 3, wherein the at least one value includes monitoring a size of a database table.

5. The system of claim 4, wherein the at least one message is a heartbeat message including the at least one value indicative of the current state of the application and/or the second cloud platform, the current state indicating at least the size of the database table.

6. The system of claim 1, wherein the container image is sent to the second cloud platform via a representational state transfer application programming interface at the first cloud platform, and wherein the at least one message is received via the representational state transfer application programming interface at the first cloud platform.

7. The system of claim 1 further comprising:
deploying the container image as a container at one or more virtual machines at the second cloud platform to provide the application at the production system.

8. The system of claim 1, wherein the alert message is sent to a system that stores and/or tracks issues with the application at the second cloud platform.

9. The system of claim 1, wherein the at least one value to be monitored is determined or set while the application is developed at the first cloud platform hosting the development system.

10. A method, comprising:
sending, by a first cloud platform hosting a development system, a container image to a second cloud platform hosting a production system, wherein the container image includes configuration instructions to configure monitoring of an application at the production system hosted at the second cloud platform and at least one value to be monitored at the application at the production system hosted at the second cloud platform;

receiving, by the first cloud platform hosting the development system, at least one message including the at least one value indicative of a current state of the application and/or the second cloud platform;

comparing, by the first cloud platform hosting the development system, the at least one value to at least one threshold; and in response to the at least one value exceeding the at least one threshold, sending an alert message.

11. The method of claim 10, wherein the container image further includes code and data for providing the application.

12. The method of claim 11, wherein the application comprises a database instance.

13. The method of claim 12, wherein the at least one value includes monitoring a size of a database table.

14. The method of claim 13, wherein the at least one message is a heartbeat message including the at least one value indicative of the current state of the application and/or the second cloud platform, the current state indicating at least the size of the database table.

15. The method of claim 10, wherein the container image is sent to the second cloud platform via a representational state transfer application programming interface at the first cloud platform, and wherein the at least one message is received via the representational state transfer application programming interface at the first cloud platform.

16. The method of claim 10 further comprising:
deploying the container image as a container at one or more virtual machines at the second cloud platform to provide the application at the production system.

17. The method of claim 10, wherein the alert message is sent to a system that stores and/or tracks issues with the application at the second cloud platform.

18. The method of claim 10, wherein the at least one value to be monitored is determined or set while the application is developed at the first cloud platform hosting the development system.

19. A non-transitory computer-readable storage medium including instructions, which when executed by at least one data processor, result in operations comprising:
sending, by a first cloud platform hosting a development system, a container image to a second cloud platform hosting a production system, wherein the container image includes configuration instructions to configure monitoring of an application at the production system hosted at the second cloud platform and at least one value to be monitored at the application at the production system hosted at the second cloud platform;

receiving, by the first cloud platform hosting the development system, at least one message including the at least one value indicative of a current state of the application and/or the second cloud platform;

comparing, by the first cloud platform hosting the development system, the at least one value to at least one threshold; and in response to the at least one value exceeding the at least one threshold, sending an alert message.

* * * * *